US011041658B2

(12) United States Patent
Fukui et al.

(10) Patent No.: US 11,041,658 B2
(45) Date of Patent: Jun. 22, 2021

(54) METHOD OF PRODUCING EXTERIOR CASE FOR HOT WATER UNIT, EXTERIOR CASE FOR HOT WATER UNIT AND HOT WATER UNIT

(71) Applicant: NORITZ CORPORATION, Hyogo (JP)

(72) Inventors: Nobuhiro Fukui, Hyogo (JP); Hiroshi Fujii, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 124 days.

(21) Appl. No.: 16/137,510

(22) Filed: Sep. 20, 2018

(65) Prior Publication Data

US 2019/0093919 A1 Mar. 28, 2019

(30) Foreign Application Priority Data

Sep. 25, 2017 (JP) .............................. JP2017-183448
Nov. 28, 2017 (JP) .............................. JP2017-228096

(51) Int. Cl.
*F24H 9/06* (2006.01)
*F24H 1/18* (2006.01)
(Continued)

(52) U.S. Cl.
CPC .............. *F24H 1/181* (2013.01); *B21D 5/002* (2013.01); *B21D 22/20* (2013.01); *B23P 23/04* (2013.01);
(Continued)

(58) Field of Classification Search
CPC ........ B21D 39/03; B21D 53/04; B21D 22/20; B21D 22/26; B21D 51/18; F28F 3/00; F22B 31/00; F22B 31/08; F24H 9/06
See application file for complete search history.

(56) References Cited

U.S. PATENT DOCUMENTS 2,084,287 A * 6/1937 Handley ................... F22B 9/04
122/18.1
3,987,928 A * 10/1976 Mori ....................... H02G 3/14
220/241
(Continued)

FOREIGN PATENT DOCUMENTS

CN 1616241 5/2005
CN 1647943 8/2005
(Continued)

OTHER PUBLICATIONS

"Office Action of China Counterpart Application", dated Apr. 2, 2021, with English translation thereof, p. 1-p. 13.

*Primary Examiner* — Gregory A Wilson
(74) *Attorney, Agent, or Firm* — JCIPRNET

(57) ABSTRACT

There is provided a method of producing an exterior case for a hot water unit including a pressing process in which press processing is performed on a flat metal plate, and a component part of an exterior case used for accommodating a hot water device for hot water production or hot water storage therein is formed; and a painting process in which any of letters, symbols, figures, and patterns is painted on the component part of the exterior case, wherein the painting process includes an ink jet printing process in which ink jet printing is performed on the flat metal plate and an ink jet printing layer is formed, and wherein the pressing process is performed after the ink jet printing process.

11 Claims, 10 Drawing Sheets

(51) Int. Cl.
  *B21D 22/20* (2006.01)
  *B21D 5/00* (2006.01)
  *B23P 23/04* (2006.01)
  *F24D 19/00* (2006.01)
  *F24H 9/02* (2006.01)
  *B41M 5/00* (2006.01)
  *B21D 51/18* (2006.01)

(52) U.S. Cl.
  CPC ........... *F24D 19/0097* (2013.01); *F24H 9/02* (2013.01); *B21D 51/18* (2013.01); *B41M 5/0047* (2013.01); *B41M 5/0058* (2013.01)

(56) References Cited

U.S. PATENT DOCUMENTS

| | | | | |
|---|---|---|---|---|
| 5,675,125 A * | 10/1997 | Hollinger | ................. | H02B 1/26 174/66 |
| 6,807,729 B2 * | 10/2004 | Kawashima | ............. | B32B 5/18 29/831 |
| 7,071,414 B2 * | 7/2006 | Kim | .................... | H02G 3/14 174/66 |
| 7,282,643 B2 * | 10/2007 | Maltby | ................. | H02G 3/081 174/66 |
| D571,729 S * | 6/2008 | Kidman | .................... | D13/139.3 |
| 7,699,026 B2 * | 4/2010 | Gordon | .................... | F24H 9/02 122/19.2 |
| 7,799,992 B2 * | 9/2010 | Pinkowski | ............... | H02G 3/14 174/66 |
| 8,109,785 B2 * | 2/2012 | Kidman | ................. | H02G 3/086 439/535 |
| 8,143,520 B2 * | 3/2012 | Cutler | ................... | H02G 3/14 174/66 |
| 8,826,817 B2 * | 9/2014 | Block | ...................... | B26F 1/44 101/28 |
| 9,219,357 B1 * | 12/2015 | Elbaz | ........................ | H02G 3/14 |
| 9,222,696 B2 * | 12/2015 | Lesage | .................. | F24H 9/2007 |
| 9,267,252 B1 * | 2/2016 | Adler | ........................ | E03F 5/04 |
| 9,289,813 B2 * | 3/2016 | Flehmig | ................. | B21D 22/20 |
| 9,755,411 B2 * | 9/2017 | Caporale | ................ | H01B 3/443 |
| 10,105,745 B2 * | 10/2018 | Adams | .................... | B21D 22/20 |
| 10,507,489 B2 * | 12/2019 | Satou | .................... | B41M 5/508 |
| 2009/0260583 A1 * | 10/2009 | Choi | ....................... | F24H 1/202 122/19.2 |
| 2012/0297621 A1 * | 11/2012 | Kuo | ....................... | F24H 1/181 29/890.14 |
| 2013/0048653 A1 * | 2/2013 | Boltshauser | ......... | B41J 3/40733 220/679 |
| 2016/0271974 A1 * | 9/2016 | Giammarco | ............. | B44C 1/14 |
| 2018/0264776 A1 * | 9/2018 | Wang | ....................... | B32B 7/06 |
| 2018/0269668 A1 * | 9/2018 | Jolly | ....................... | H02G 3/14 |
| 2019/0093920 A1 * | 3/2019 | Fukui | .................... | F24D 19/0097 |
| 2019/0111463 A1 * | 4/2019 | Natori | ..................... | B21D 5/01 |
| 2019/0162445 A1 * | 5/2019 | Fukui | ....................... | F24H 9/02 |
| 2020/0206798 A1 * | 7/2020 | Sakamoto | ............. | B21D 22/20 |

FOREIGN PATENT DOCUMENTS

| | | | |
|---|---|---|---|
| CN | 1803473 | 7/2006 | |
| CN | 202163049 | 3/2012 | |
| CN | 105073419 | 11/2015 | |
| JP | H06247097 | 9/1994 | |
| JP | H10296906 | 11/1998 | |
| JP | H11294867 | 10/1999 | |
| JP | 2012032029 | 2/2012 | |
| JP | 2014040950 | 3/2014 | |
| JP | 2014102004 A * | 6/2014 | ......... F24D 19/0097 |

* cited by examiner

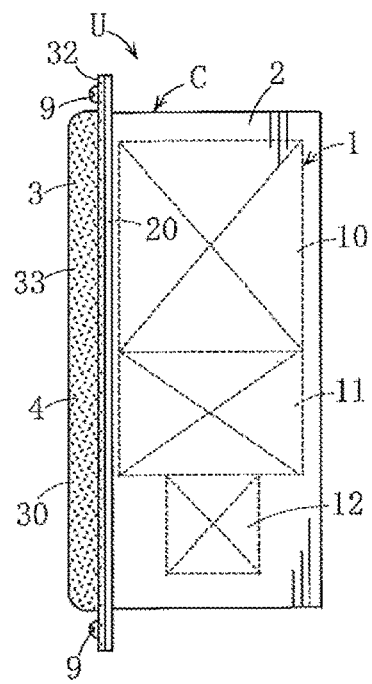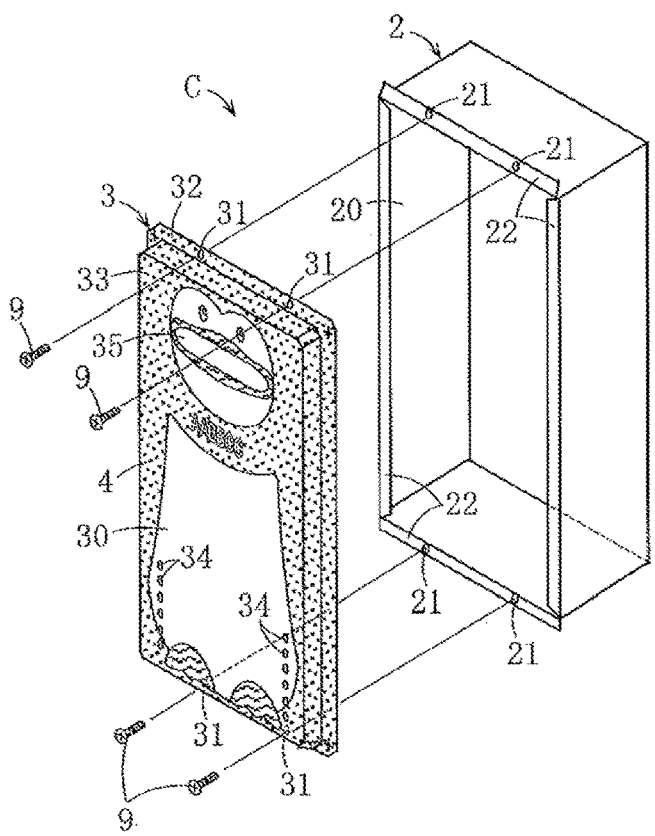
FIG. 1(a)  FIG. 1(b)
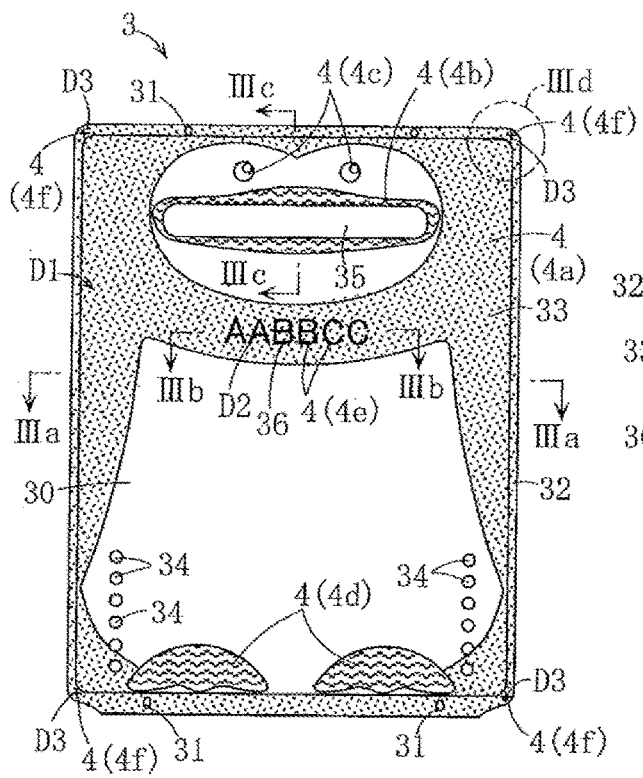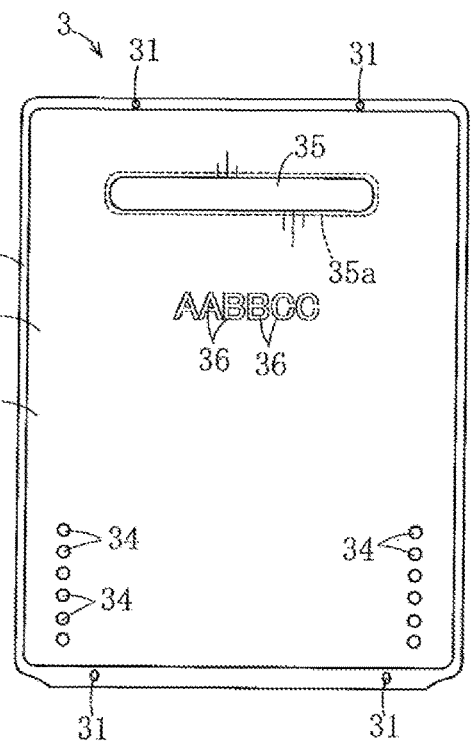
FIG. 2(a)  FIG. 2(b)

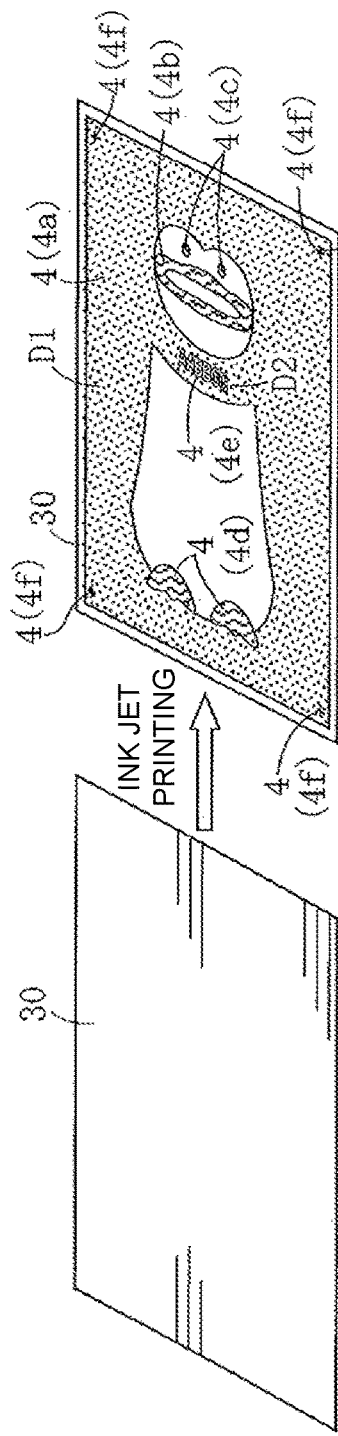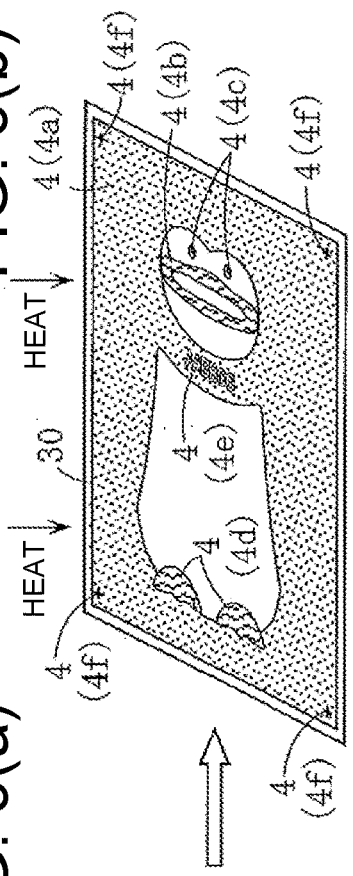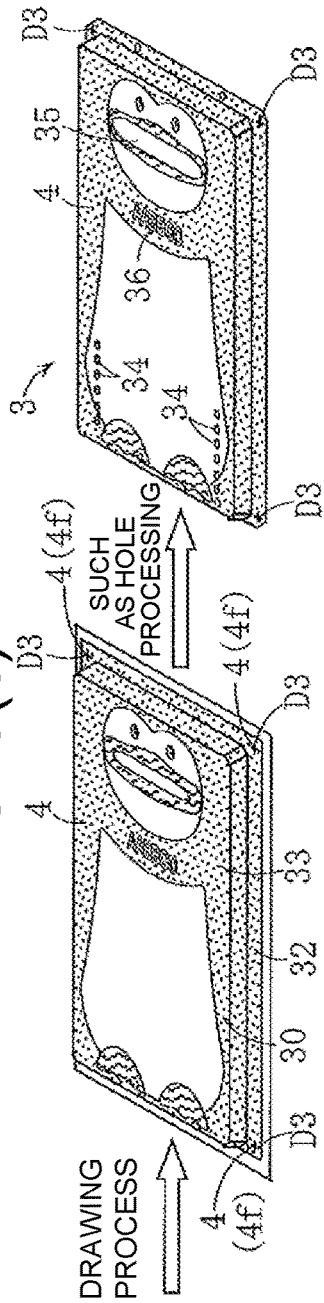

METHOD OF PRODUCING EXTERIOR CASE FOR HOT WATER UNIT, EXTERIOR CASE FOR HOT WATER UNIT AND HOT WATER UNIT

CROSS-REFERENCE TO RELATED APPLICATION

This application claims the priority benefit of Japan Applications No. 2017-183448 and No. 2017-228096, respectively filed on Sep. 25, 2017 and Nov. 28, 2017. The entirety of the above-mentioned patent application is hereby incorporated by reference herein and made a part of this specification.

BACKGROUND

Technical Field

The disclosure relates to a production method of producing an exterior case for a hot water unit used for accommodating a hot water device for hot water production or hot water storage therein in a hot water unit, for example, a water heater or a cogeneration system, an exterior case for a hot water unit, and a hot water unit.

Description of Related Art

As specific examples of a hot water unit configured as a water heater, for example, there are hot water devices which are configured to perform hot water heating using combustion gas generated by a burner and which are accommodated in an exterior case (for example, refer to Patent Document 1 (Japanese Laid-open No. 2012-32029), Patent Document 2 (Japanese Laid-open No. H11-294867), and Patent Document 3 (Japanese Laid-open No. 2014-40950)). Such exterior cases for a hot water unit are generally produced by pressing a colored steel plate having a monochromatic surface, producing a plurality of metal plate parts, and then bonding a plurality of these metal plate parts.

In such a hot water unit, in addition to displaying letters or symbols representing, for example, a manufacturer name, a type or capabilities of the hot water unit, on the exterior case, it may be required to make a large area of a front surface of the exterior case in a predetermined color different from the background color of the front surface of the colored steel plate. In this case, in the related art, after component parts (an exterior case main body and a cover body) of the exterior case are formed by press molding, the component parts are painted by a spray system. A solvent paint or a powder paint may be used as the paint.

However, in the above related art, as will be described below, there is room for improvement.

That is, when a painting method using the spray system of the related art is used, in addition to troublesome masking processing on an uncoated part and paint color matching, a paint spraying operation using a spray gun (air gun) is also troublesome and expert skills are also required. Therefore, the workability and productivity are poor. In addition, since paint is also sprayed onto a masking part, there is much waste of paint. Therefore, production costs of the exterior case and production costs of the hot water unit are high. Such circumstances become more complicated and the number of colors increases, and it is difficult to express fine patterns. Further, when a solvent paint or a powder paint as a spray paint is used, the environmental load is large, and it is difficult to maintain a favorable state of an operation environment and appropriately perform a paint disposal process.

In addition, in the related art, it is difficult to appropriately perform predetermined painting on an uneven part of the exterior case or the like because painting is performed after the exterior case is press-molded.

Here, in the related art, a painting method using a transfer system may be appropriately used. However, according to the painting method using this system, a transfer plate is necessary and high costs are incurred. In addition, it is unsuitable for painting a large area.

Accordingly, it is desirable to address the above circumstances. However, as described above, the exterior case is assembled by bonding a plurality of metal plate parts(for example, refer to Patent Document 4 (Japanese Laid-open No. No. H6-247097) and Patent Document 5 (Japanese Laid-open No. H10-296906)).

Therefore, in order to address the above circumstances, it is desired to prevent interference with an assembling operation of the exterior case.

Patent Documents

SUMMARY

A method of producing an exterior case for a hot water unit provided according to a first aspect of the disclosure includes a pressing process in which press processing is performed on a flat metal plate, and a component part of an exterior case used for accommodating a hot water device for hot water production or hot water storage therein is formed; and a painting process in which any of letters, symbols, figures, and patterns is painted on the component part of the exterior case, wherein the painting process includes an ink jet printing process in which ink jet printing is performed on the flat metal plate and an ink jet printing layer is formed, and wherein the pressing process is performed after the ink jet printing process.

A method of producing an exterior case for a hot water unit used for accommodating a hot water device for hot water production or hot water storage therein provided according to a second aspect of the disclosure includes a bonding process in which a plurality of metal plate parts are bonded together; and a painting process in which painting is applied to at least a part of the plurality of metal plate parts, wherein the painting process includes an ink jet printing process, and wherein the ink jet printing process is performed before the bonding process, and ink jet printing is not performed on a predetermined area to be subjected to the bonding process among the plurality of metal plate parts.

Here, the ink jet printing is a painting method in which an ink jet printing layer is formed by spraying ink droplets in the form of fine liquid droplets onto a painting target area using an ink jet printer.

An exterior case for a hot water unit used for accommodating a hot water device for hot water production or hot water storage therein provided according to a third aspect of the disclosure includes a bonding processing part for bonding a plurality of metal plate parts; and a painting film that is provided on at least a part of an outer surface area of the plurality of metal plate parts, wherein the painting film includes an ink jet printing layer, and wherein the ink jet printing layer is provided on parts except the bonding processing part among the plurality of metal plate parts.

Other features and contents of the disclosure will become more apparent based on the following description of embodiments of the disclosure with reference to the appended drawings.

BRIEF DESCRIPTION OF THE DRAWINGS

FIG. 1(a) is a side view showing an example of a hot water unit including an exterior case produced by a production method according to an embodiment of the disclosure and FIG. 1(b) is an exploded perspective view of the exterior case shown in FIG. 1(a).

FIG. 2(a) is a front view of a cover body of the exterior case shown in FIG. 1 and FIG. 2(b) is a front view of the cover body in which an ink jet printing layer is omitted.

FIGS. 5(a) to 5(e) are explanatory diagrams showing an example of the production method according to an embodiment of the disclosure, and correspond to a series of operational processes of a method of producing the cover body shown in FIG. 1 and FIG. 2(a).

DESCRIPTION OF THE EMBODIMENTS

Figure 3A:
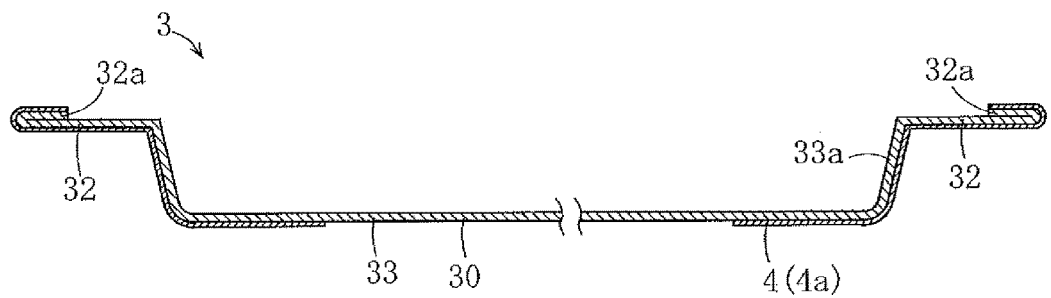
FIG. 3(a) is a cross-sectional view taken along the line IIIa-IIIa in FIG. 2(a)

The embodiments of the disclosure provide a method of producing an exterior case for a hot water unit through which, even if a complex pattern or the like is formed in the exterior case for a hot water unit, it is possible to produce the exterior case in a simple operational process with high productivity and with low costs without environmental pollution, and in which the overall design properties are favorable, and an exterior case for a hot water unit, and a hot water unit including the same.

The embodiments of disclosure provide the following technical aspects.

In such a configuration of the first aspect of the disclosure, the following can be obtained.

That is, as the painting process of the component part of the exterior case, the ink jet printing process for forming an ink jet printing layer is included. However, this ink jet printing process can be easily performed using an ink jet printer. Unlike painting using a spray system of the related art, masking processing on the exterior case and paint color matching are not performed, and expert skills are not required. In addition, unlike painting using the transfer system of the related art, a transfer plate is not used and it is easy to paint a large area. Therefore, it is possible to improve productivity for the exterior case. In addition, since the ink jet printing layer can be provided only at a desired part, it is possible to eliminate or reduce waste of the ink paint. As a result, it is possible to reduce production costs of the exterior case and production costs of the hot water unit. Furthermore, according to the ink jet printing, since it is possible to finely represent patterns with complex shapes or patterns in which many colors are used, it is suitable for improving an external appearance of the hot water unit. In addition, compared with the related art, it is possible to reduce the environmental load and easily realize a favorable state of the operation environment.

In addition, since the ink jet printing is performed before the pressing process, unlike the related art, it is possible to appropriately address the difficulty of painting (printing) on an uneven part formed according to pressing process.

In one or some exemplary embodiments of the disclosure, the exterior case includes an exterior case main body having at least one surface as an opening and a cover body that is attached to the exterior case main body to block the opening, and the painting process and the pressing process are performed as a method of producing the cover body.

In such a configuration, according to the painting process on the cover body of the exterior case, it is possible to efficiently design the exterior case.

In one or some exemplary embodiments of the disclosure, the pressing process includes a process in which drawing processing is performed on the metal plate, and, in the ink jet printing process, within a predetermined area in which the drawing process is scheduled, a thickness of an ink jet printing layer of a part in which a plate thickness of the metal plate is thinner than other parts is thinner than a thickness of an ink jet printing layer of other parts.

In such a configuration, the following can be obtained.

That is, before the drawing process is performed on the metal plate, when the ink jet printing process is performed, if the thickness of the entire ink jet printing layer of a predetermined area to be subjected to the drawing process is large and uniform, there is a risk of the ink jet printing layer peeling off at a part (within the drawn part, a part whose plate thickness is thinner than other parts) in which an amount of the metal plate drawn is large when the drawing process is performed. On the other hand, according to the above configuration, it is possible to appropriately avoid such risks.

In one or some exemplary embodiments of the disclosure, the pressing process includes a process in which a burring hole having a burring part projecting from a peripheral edge of the opening is provided in the metal plate; and, in the ink jet printing process, on a predetermined area scheduled to become the burring part, an ink jet printing layer connected to an ink jet printing layer provided on a part surrounding thereof is provided.

In such a configuration, it is possible to paint the part surrounding the burring hole and the burring part in colors or patterns connected continuously, and it is possible to make an external appearance of the part favorable. Unlike the above configuration, when the ink jet printing layer is provided, for example, only on the part surrounding the burring hole, and no ink jet printing layer is provided on the burring part, there is a risk that the burring part may appear as an unnatural part from the outside. However, according to the above configuration, it is possible to eliminate such circumstances.

In one or some exemplary embodiments of the disclosure, in the ink jet printing process, a marker for positioning the metal plate when the pressing process is performed is printed.

In such a configuration, when the pressing process is performed, it is possible to perform positioning of the metal plate using a marker for positioning represented on the ink jet printing layer as a reference. Therefore, it is possible to accurately position letters and patterns represented on the ink jet printing layer and a part subjected to press processing.

In one or some exemplary embodiments of the disclosure, in the ink jet printing, an ink containing a UV curable resin is used, and in a procedure of moving a print head for ink jet printing and allowing an operation of applying the ink to the metal plate to proceed, a process in which ultraviolet radiation is emitted to the ink applied to the metal plate is performed at the same time.

In such a configuration, during ink jet printing, it is possible to quickly cure the ink jet printing layer by emitting ultraviolet rays. When a new ink jet printing layer having a different color is provided in a part adjacent to the uncured ink jet printing layer, there is a risk of occurrence of bleeding. However, according to the above configuration, it is possible to prevent occurrence of such a risk.

In one or some exemplary embodiments of the disclosure, in the ink jet printing, an ink containing a thermosetting resin is used, and after the ink jet printing is completed, the thermosetting resin is cured by heating the ink jet printing layer, and after the curing, the pressing process is performed.

In such a configuration, after the ink jet printing is completed, when the ink jet printing layer is heated and the thermosetting resin is cured, it is possible to increase the strength of the ink jet printing layer. Therefore, it is possible to obtain an ink jet printing layer having excellent weather resistance and it is possible to obtain sufficient strength to withstand a subsequent pressing process.

In such a configuration of the second aspect of the disclosure, the following can be obtained.

First, for the painting process of the metal plate part constituting the exterior case, the ink jet printing process is included. However, according to the ink jet printing process, unlike painting using a spray system of the related art, masking processing on the exterior case and paint color matching are not performed, and expert skills are not required. In addition, unlike painting using the transfer system of the related art, a transfer plate is not used and it is easy to paint a large area. Therefore, it is possible to improve productivity for the exterior case. In addition, since the ink jet printing layer can be provided only at a desired part, it is possible to eliminate or reduce waste of the ink paint. As a result, it is possible to reduce production costs of the exterior case and production costs of the hot water unit. Furthermore, according to the ink jet printing, since it is possible to finely represent patterns with complex shapes or patterns in which many colors are used, it is more suitable for improving an external appearance of the hot water unit. In addition, compared with the related art, it is possible to reduce the environmental load and easily realize a favorable state of the operation environment.

Second, after a plurality of metal plate parts are bonded together, there is a risk of ink jet printing on a desired part of the metal plate part becoming difficult. However, according to one or some exemplary embodiments of the disclosure, since the ink jet printing process is performed before the bonding process, there is no such a risk.

Third, since ink jet printing is not performed in a part subjected to bonding processing within the metal plate part, the ink jet printing layer does not hinder bonding processing. For example, when a tox caulking method is used as a bonding method, if ink jet printing is performed on the caulking target area, since the thickness of the caulking target area is large, tox caulking tends to be insufficient. In addition, when a part of the ink jet printing layer is caulked, there are risks of cracks and the like occurring in the part, and adverse effects being caused on other parts of the ink jet printing layer. On the other hand, when welding is used as the bonding method, the ink jet printing layer makes welding difficult. On the other hand, according to one or some exemplary embodiments of the disclosure, it is possible to appropriately avoid such risks. In addition, according to one or some exemplary embodiments of the disclosure, since a predetermined area to be subjected to bonding processing is avoided in ink jet printing, it is possible to reduce waste of an ink for ink jet printing and further reduce production costs.

In one or some exemplary embodiments of the disclosure, the method further includes a pressing process in which at least one of the plurality of metal plate parts is formed by pressing a flat metal plate before the bonding process, wherein the ink jet printing process is performed before press processing is performed on the flat metal plate.

In such a configuration, the following can be obtained.

That is, unlike the above configuration, when ink jet printing is performed after the pressing process, there is a risk of ink jet printing on an uneven part of the metal plate formed in the pressing process becoming difficult. On the other hand, according to the above configuration, it is possible to eliminate such a risk and it is possible to perform ink jet printing easily and appropriately.

In one or some exemplary embodiments of the disclosure, the plurality of metal plate parts are a frame having a peripheral wall constituting a part of the exterior case main body having a front opening and a back plate for blocking a rear opening of the frame, wherein the pressing process includes a process in which the flat metal plate is bent and the frame is formed, and a flange part overlapping an outer surface of the back plate is connected to a rear peripheral edge of the frame, wherein the bonding process includes bonding processing in which a plurality of parts of the flange part and the back plate are bonded together, and wherein, in the ink jet printing process, within the flat metal plate, substantially the entire area of a part corresponding to an outer surface of the peripheral wall of the exterior case main body, and within an area corresponding to an outer surface of the flange part, substantially the entire area except for a predetermined area to be subjected to the bonding processing, are subjected to ink jet printing.

In such a configuration, since ink jet printing is performed on not only the outer surface of the peripheral wall of the frame constituting the exterior case but also a large area of the outer surface of the flange part (this flange part is positioned on the back side of the exterior case) connected to a rear peripheral edge of the frame, it is possible to improve an appearance of the back side of the exterior case. On the other hand, since an ink jet printing layer is not provided in an area on which bonding processing for bonding with the back plate is performed within the flange part, it is possible to prevent interference with bonding processing between the flange part and the back plate by the ink jet printing layer.

In such a configuration of the third aspect of the disclosure, in the same manner as in the method of producing an exterior case for a hot water unit provided according to the second aspect of the disclosure, even if a complex pattern or the like is formed, it is possible to produce an exterior case for a hot water unit in which the overall design properties are favorable with high productivity and with low costs without environmental pollution. In addition, it is possible to appropriately avoid circumstances such as interference with bonding processing between metal plate parts.

In one or some exemplary embodiments of the disclosure, the bonding processing part is a caulking part.

As a representative example of the caulking part, tox caulking can be exemplified. In such a configuration, it is easy to bond metal plate parts.

In one or some exemplary embodiments of the disclosure, the exterior case for a hot water unit includes an exterior case main body having a front opening, wherein the exterior case main body includes a frame having a peripheral wall constituting a part of the exterior case main body and a back plate for blocking a rear opening of the frame, wherein a flange part overlapping an outer surface side of the back plate is connected to a rear peripheral edge of the frame and the bonding processing part is provided at a plurality of parts of the flange part and the back plate, and wherein the ink jet printing layer is provided on substantially the entire area of the outer surface of the peripheral wall of the frame and within the flange part, substantially the entire area excluding the bonding processing part.

In such a configuration, since ink jet printing is performed on not only the outer surface of the peripheral wall of the frame constituting the exterior case but also a wide range of the outer surface of the flange part (this flange part is positioned on the back side of the exterior case) connected to a rear peripheral edge of the frame, it is possible to improve an appearance of the back side of the exterior case. On the other hand, since no ink jet printing layer is provided in an area on which bonding processing is performed within the flange part, it is possible to appropriately avoid interference with bonding processing by the ink jet printing layer.

Exemplary embodiments of the disclosure will be described below in detail with reference to the drawings.

First, in order to facilitate understanding, configurations of an exterior case C for a hot water unit produced by a production method of the present embodiment and a hot water unit U including the same will be described.

EXAMPLE 1

In FIG. 1, a hot water unit U is a water heater, and has a configuration in which a hot water device 1 for hot water production is accommodated in an exterior case C. The hot water device 1 includes a heat exchanger 10 through which hot water flows, a burner 11 configured to heat hot water in the heat exchanger 10, and a fan 12 configured to supply combustion air to the burner 11.

The exterior case C includes a rectangular box-shaped exterior case main body 2 having an opening 20 on its front surface and a cover body 3 (front cover body) for blocking the opening 20. The cover body 3 is detachably attached to a front part of the exterior case main body 2 using a screw body 9, for example, a screw, and screw insertion holes 31 and 21 into which the screw body 9 is inserted.

In the present embodiment, an ink jet printing layer 4 (in the drawing, part marked with a dot pattern or a wavy line pattern) is provided on the cover body 3, but it is not provided on the exterior case main body 2. Therefore, hereinafter, a configuration of the cover body 3 will be described in detail and the exterior case main body 2 will not be described. However, as will be described below, of course, an ink jet printing layer may be provided on the exterior case main body 2.

The cover body 3 has a configuration in which the ink jet printing layer 4 (4a to 4g) is provided on a press-molded colored steel plate 30 (an example of a metal plate) to be described below. However, when the cover body 3 in the present embodiment is produced, as will be described below, after the ink jet printing layer 4 is provided on the colored steel plate 30, press processing is performed.

The cover body 3 has a substantially rectangular panel shape in a front view and includes an outer peripheral flange part 32 and a bulging part 33 that is surrounded by the outer peripheral flange part 32 and bulges forward (to the front side of the exterior case C) from the outer peripheral flange part 32. The outer peripheral flange part 32 is a part which abuts a substantially rectangular frame-like flange part 22 provided on the front part of the exterior case main body 2. As shown in FIG. 3(a), a folded part 32a is connected to an outer edge part thereof by hemming processing.

The bulging part 33 of the cover body 3 occupies most of the cover body 3, and an air supply port 34 and an exhaust port 35 are provided in the bulging part 33 (refer to FIG. 2(a) and FIG. 2(b)). The air supply port 34 is a part that enables outside air to flow into the exterior case C. The exhaust port 35 is a part for discharging exhaust gas from which heat recovery by the heat exchanger 10 has been completed to the outside of the exterior case C, and as shown in FIG. 3(c), is formed as a burring hole in which a tubular burring part 35a is connected to its peripheral edge part. Similarly to the exhaust port 35, the air supply port 34 can be formed as a burring hole.

As will be described below, the ink jet printing layer 4 is a coating layer provided by using an ink jet printer 8. As an ink for ink jet printing, a water-based pigment ink or a solvent-based pigment ink can be used. However, in the present embodiment, an ink containing a UV curable resin, and a thermosetting resin is used.

As the ink jet printing layer 4 provided on a front surface of the cover body 3, for example, the ink jet printing layers 4a to 4d representing a predetermined pattern D1 such as a penguin and the ink jet printing layer 4e representing characters D2 (in the drawing, "AABBCC" as an example) of a manufacturer, a model, or a trademark of the hot water unit U are provided. In addition, on four corners of the cover body 3, an ink jet printing layer 4f representing a positioning mark D3 during press processing to be described below is provided. In the drawing, the positioning mark D3 is shown in a (+) shape, but the disclosure is not limited thereto. In addition, the positioning mark D3 may be provided on a back surface of the cover body 3 in place of or in addition to the front surface of the cover body 3.

Figure 4:
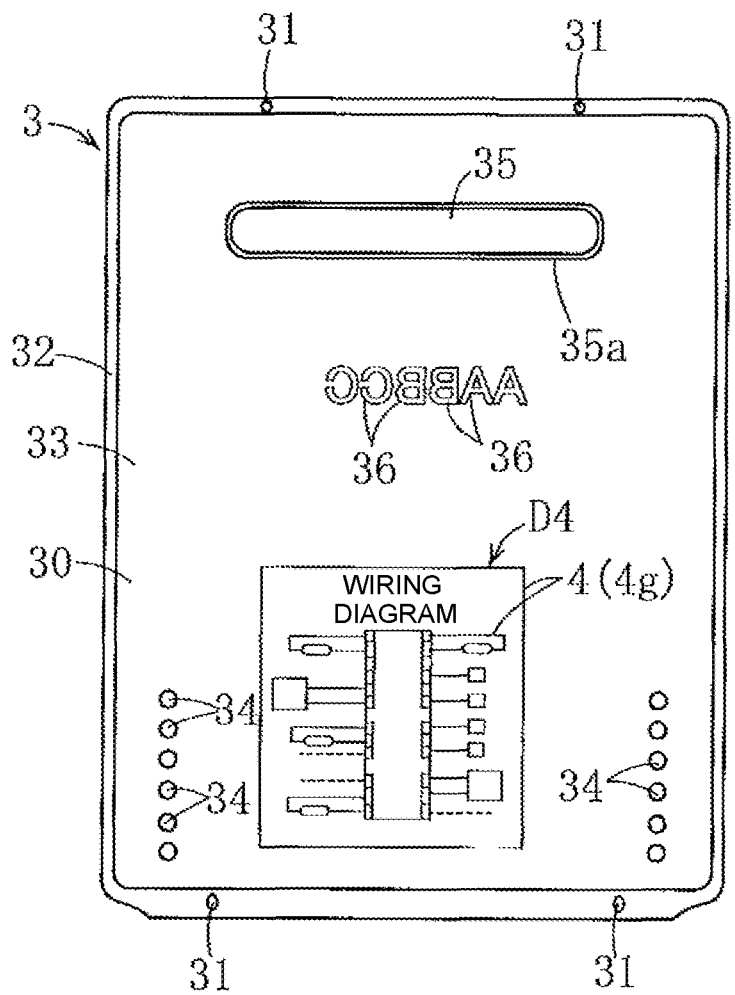
FIG. 4 is a rear view of the cover body shown in FIG. 1 and FIG. 2(a).

As shown in FIG. 4, on the back surface of the cover body 3, the ink jet printing layer 4g representing an electrical wiring diagram D4 of the hot water device 1 is further provided. In place of or in addition to the electrical wiring diagram D4, a configuration showing a piping diagram of the hot water device 1 can be used. Although illustration is omitted, on the back surface of the cover body 3, separately from the electrical wiring diagram D4 and the piping diagram, a configuration further including an ink jet printing layer representing a description of a specification of the hot water unit U, notes, etc. can be used.

Figure 6:
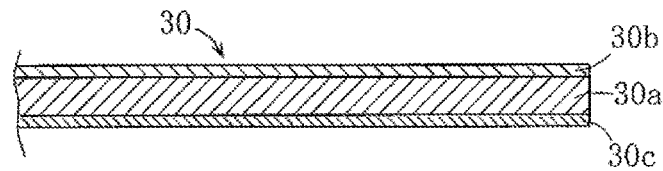
FIG. 6 is a cross-sectional view of a main part showing an example of a colored steel plate used for producing the cover body shown in FIG. 1 and FIG. 2(a).

As shown in FIG. 6, the colored steel plate 30 as a raw material of the cover body 3 has a multi-layer structure including a plated steel plate 30a, a white series (including white) front side paint layer 30b laminated on a front surface of the plated steel plate 30a, and a back side paint layer 30c as a base coat laminated on a back surface of the plated steel plate 30a. The ink jet printing layers 4a to 4e represent the pattern D1 such as the above penguin figure and the characters D2 in a color different from that of the white series front paint layer 30b. A white part in FIG. 2(a) is a part of the front paint layer 30b of the colored steel plate 30 on which ink jet printing is not applied.

Basically, the entire ink jet printing layer 4a is formed in the same color and the same thickness. However, as shown in FIG. 3(d), a thickness to of a corner 33a' of a peripheral wall 33a (a wall raised forward from the outer peripheral flange part 32) of the bulging part 33 is thinner than a thickness tb of other parts of the peripheral wall 33a and a thickness of a part other than the peripheral wall 33a. The bulging part 33 is formed in a drawing process. In this drawing process, an extending amount at the corner 33a' of the peripheral wall 33a becomes the largest (the corner 33a' corresponds to an example of "a part whose plate thickness is thinner than other parts in the drawn part" in the disclosure). In connection with this, if the thickness to of the ink jet printing layer 4a at the part is set to be smaller, as will be described below, a separation prevention effect of the ink jet printing layer 4a can be obtained. Here, when an amount of the peripheral wall 33a drawn (extending amount) is increased in order to increase an amount of the bulging part 33 bulged, the thickness tb of a part other than the corner 33a' of the peripheral wall 33 may be formed to be thinner than a thickness of other parts of the ink jet printing layer 4a.

While the ink jet printing layer 4b is provided on a part surrounding the exhaust port 35, as described with reference to FIG. 3(c), the exhaust port 35 is formed as a burring hole having the burring part 35a. On the other hand, a part of the ink jet printing layer 4b is also provided on an inner surface of the burring part 35a. Accordingly, a part surrounding the exhaust port 35 and an inner surface of the burring part 35a can be formed in the same color or pattern, and it is possible to improve the appearance of the exhaust port 35 and parts surrounding thereof.

Figure 3B:
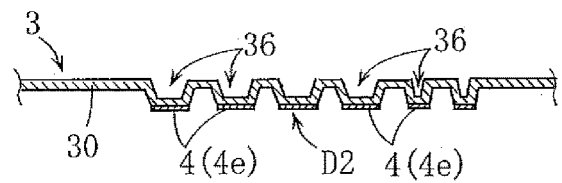
FIG. 3(b) is a cross-sectional view of a main part taken along the line IIIb-IIIb in FIG. 2(a)
Figure 3C:
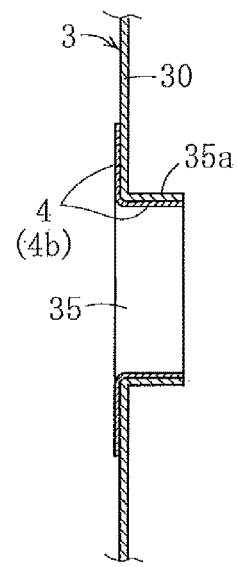
FIG. 3(c) is a cross-sectional view of a main part taken along the line IIIc-IIIc in FIG. 2(a)
Figure 3D:
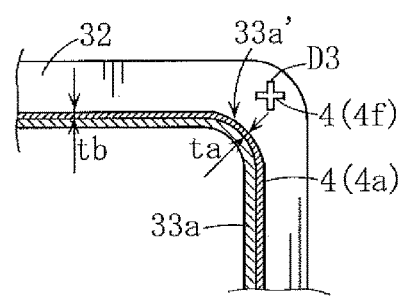
FIG. 3(d) is a front cross-sectional view of a part indicated by a reference numeral IIId in FIG. 2(a).

The ink jet printing layer 4e is provided on a front surface of a step pushing part 36 (refer to FIG. 2(b) and FIG. 3(b)) three-dimensionally representing the characters D2. More specifically, the step pushing part 36 is a part in which the characters D2 are three-dimensionally shaped when a part of the colored steel plate 30 is partially extruded by press processing, and the ink jet printing layer 4e is provided on a front part of the step pushing part 36. As the step pushing part 36, there are a front side convex form in which a part of the colored steel plate 30 is extruded to the front side of the cover body 3 and a front side concave form in which a part of the colored steel plate 30 is extruded to the rear side of the cover body 3, but either of them may be used.

Next, an example of a method of producing the above cover body 3 will be described.

First, as shown in FIG. 5(a), as a raw material of the cover body 3, the flat colored steel plate 30 described with reference to FIG. 6 is prepared. Next, ink jet printing is performed on the colored steel plate 30. Therefore, as shown in FIG. 5(b), the ink jet printing layer 4 is provided. Specific examples of the ink jet printing layer 4 are as described above.

Figure 7A:
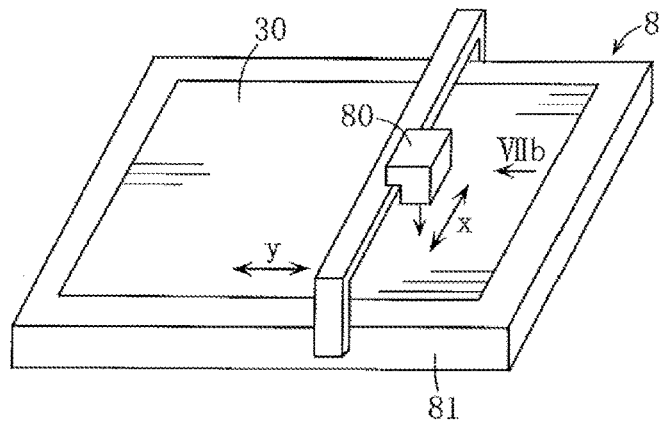
FIG. 7(a) is a perspective view showing an example of a schematic configuration of a printer used for ink jet printing.
Figure 7B:
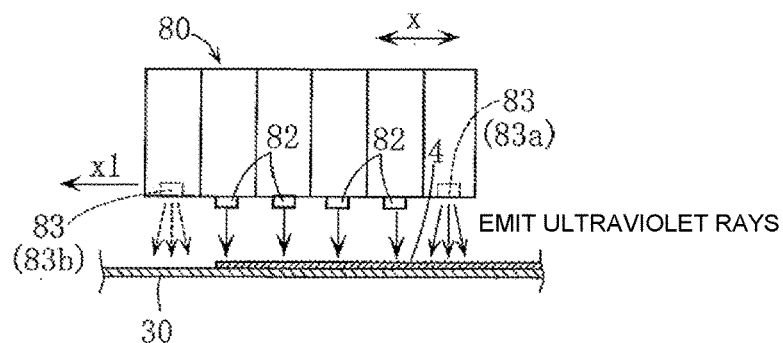
FIG. 7(b) is a diagram when viewed in the direction of the arrow VIIb in FIG. 7(a) and is a diagram showing a schematic structure of a print head of the printer shown in FIG. 7(a).

The ink jet printing is performed, for example, using the ink jet printer 8 shown in FIG. 7(a). In the ink jet printer 8, a print head 80 is freely movable in x and y directions that are orthogonal to each other on the side above a mounting table 81 on which the colored steel plate 30 is mounted and supported. As shown in FIG. 7(b), the print head 80 includes a plurality of ink jet nozzles 82 through which an ink jet paint in a predetermined color is made into fine droplets and sprayed toward the colored steel plate 30. This point is the same as that known in the related art, but in the present embodiment, a pair of UV light sources 83 (83a and 83b) are further provided.

For example, when ink jet printing is performed while the print head 80 is moved in an x1 direction in FIG. 7(b) as a main scanning direction, the UV light source 83a on the rear side in the main scanning direction is caused to emit light, and ultraviolet rays are emitted to an area immediately after ink jet printing is performed. Since a UV curable resin is contained in the ink jet printing layer 4, it is possible to rapidly cure (curing to a degree that bleeding to be described below does not occur) the ink jet printing layer 4 by emitting ultraviolet rays described above. Therefore, it is possible to prevent circumstances such as occurrence of bleeding due to mixing of uncured ink jet printing layers 4 with different colors. When ink jet printing proceeds in a direction opposite to the above x1 direction, the UV light source 83b is caused to emit light in place of the UV light source 83a, and thus the same actions as described above are obtained.

Here, when the ink jet printing layer 4a is provided, the thickness to of a part scheduled to become the corner 33a' of the peripheral wall 33a within the colored steel plate 30 shown in FIG. 3(d) is set to be thinner than the thickness tb of other parts.

After the above ink jet printing on both front and back surfaces of the colored steel plate 30 is completed, as shown in FIG. 5(c), the colored steel plate 30 is heated, the ink jet printing layer 4 is dried, and a thermosetting resin contained in the ink jet printing layer 4 is cured. This heating is performed using, for example, a heating furnace. According to such processing, it is possible to increase the strength of the ink jet printing layer 4 and impart favorable weather resistance, and also provide excellent durability in press processing performed thereafter.

Next, drawing processing as press processing is performed on the above colored steel plate 30, and as shown in FIG. 5(d), the outer peripheral flange part 32 and the bulging part 33 are formed. Then, as shown in FIG. 5(e), a press process in which the air supply port 34, the exhaust port 35, the step pushing part 36, and the like are formed, a trimming process in which extra parts of the outer peripheral flange part 32 are removed, a subsequent hemming process, and the like are performed.

According to the series of operational processes described above, it is possible to appropriately produce the above cover body 3.

Figure 8:
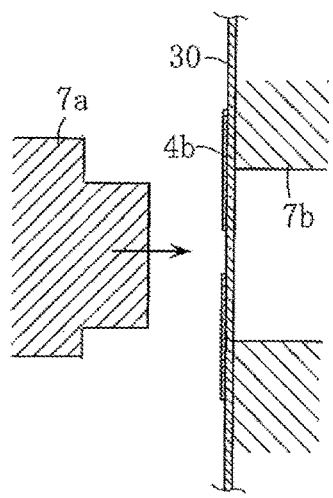
FIG. 8 is a cross-sectional view of a main part showing an example of an operational process for obtaining the structure in FIG. 3(c).

In the above pressing process, using the positioning mark D3 as a reference, it is possible to accurately position the colored steel plate 30. In addition, an operation of forming the exhaust port 35 is performed using, for example, a punch 7a and a die 7b as shown in FIG. 8. However, since the ink jet printing layer 4b is provided continuously not only on a part surrounding a part in which the exhaust port 35 is scheduled to be formed but also on a part in which the exhaust port 35 is to be formed, as shown in FIG. 3(c), a configuration in which the ink jet printing layer 4b is provided continuously from the part surrounding the exhaust port 35 to the burring part 35a can be appropriately realized.

In the exterior case C including the above cover body 3, since the pattern D1 such as a penguin is represented on the front part of the cover body 3, for example, compared with the cover body 3 whose front surface is formed in a single color with no pattern, it is possible to obtain excellent design properties. In addition, since an inner surface of the burring part 35a of the exhaust port 35 is painted in continuity with a part surrounding the exhaust port 35, an external appearance is more favorable than a case in which an inside of the burring part 35a is formed in a color different from that of the part surrounding the burring part 35a. In addition, at the corner 33a' of the peripheral wall 33a, a part of the colored steel plate 30 extends greatly according to the drawing process. However, since the thickness to of the ink jet printing layer 4 at the part is made thinner than the thickness tb of other parts, it is possible to prevent a risk of the ink jet printing layer 4 being easily separated according to the above drawing process.

On the back surface of the cover body 3, since the electrical wiring diagram D4 or the piping diagram is represented on the ink jet printing layer 4g, it is useful for maintenance work and the like. For example, in a method of attaching a sheet on which an electrical wiring diagram is printed to the back surface of the cover body 3, there is a risk of the sheet breaking or separating from the cover body 3 and being lost. However, according to the present embodiment, there is no such a risk.

Since the coating layers representing the pattern D1, the characters D2, the positioning mark D3, and the electrical wiring diagram D4 of the cover body 3 are all set as the ink jet printing layer 4, it is possible to easily provide them using the above ink jet printer 8. For example, unlike painting using a spray system, masking processing and paint color matching are not performed, and expert skills are not required. Therefore, it is possible to improve workability and productivity. In addition, it is easy to change the design of the pattern D1 or the like, and production of small quantities of many different kinds is appropriate. In addition, according to ink jet printing, there is no or little waste of the ink paint, and the environmental load is also small.

Furthermore, after the ink jet printing is completed, since a pressing process is performed, there is no difficulty in painting an uneven part formed in the pressing process.

EXAMPLE 2

Figure 9A:
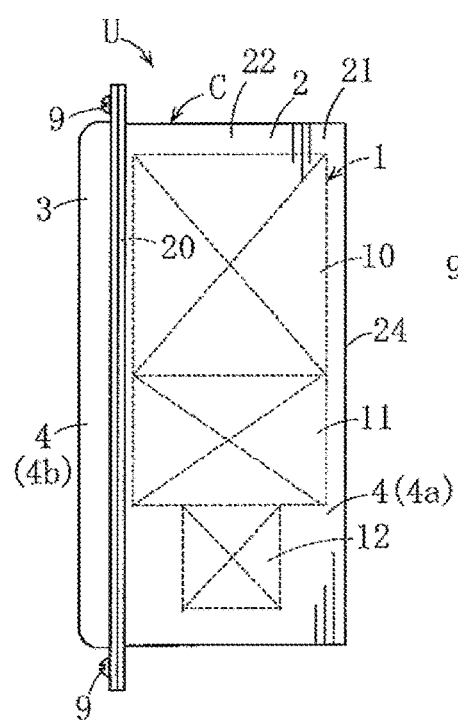
FIG. 9(a) is a side view showing an example of a hot water unit according to an embodiment of the disclosure and FIG. 9(b) is an exploded perspective view of an exterior case (when an internal hot water device is omitted) of the hot water unit shown in FIG. 9(a).
Figure 9B:
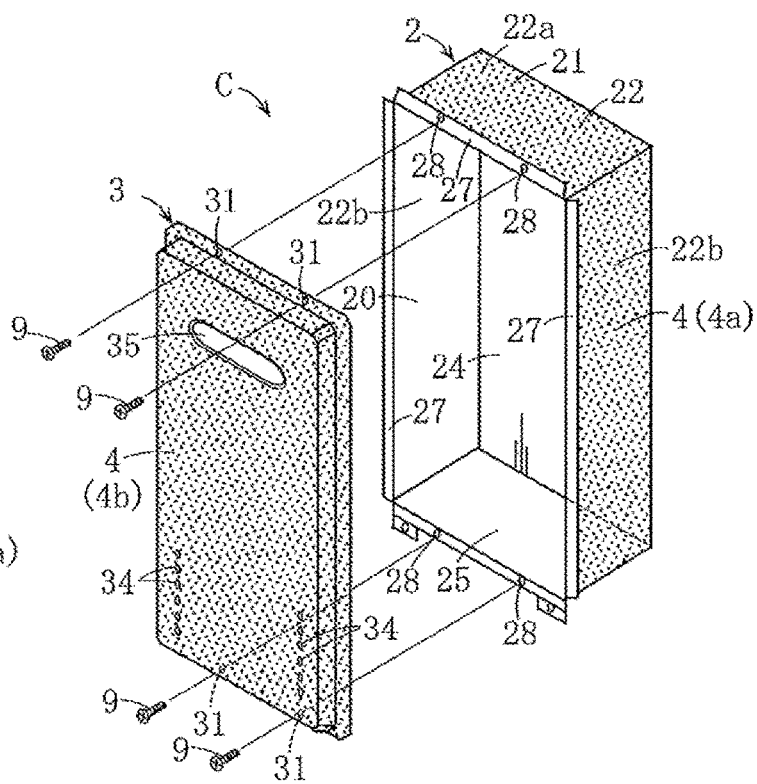
Figure 10A:
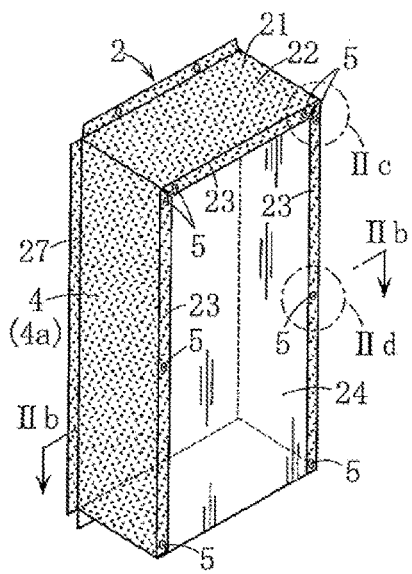
FIG. 10(a) is a rear perspective view of an exterior case main body of the exterior case shown in FIG. 9.
Figure 10B:
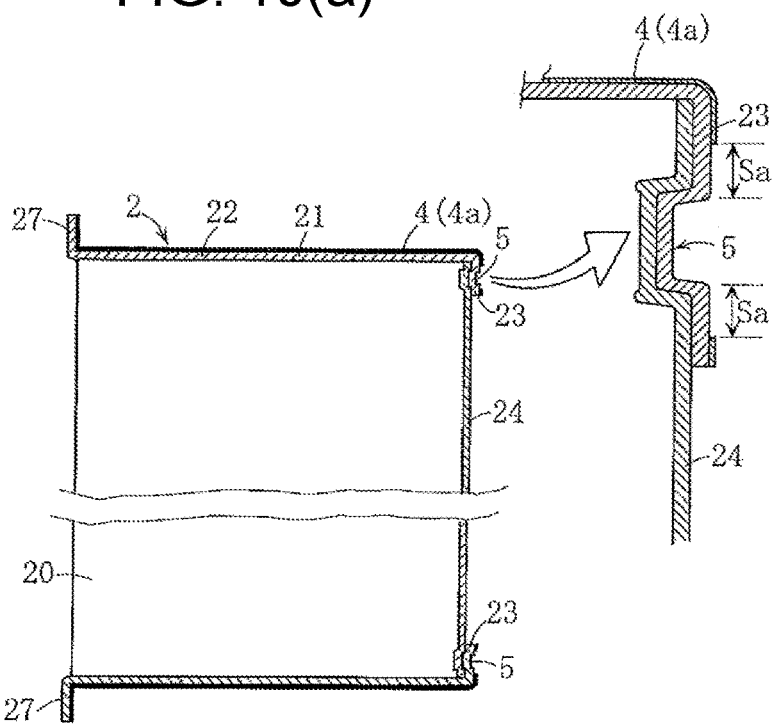
FIG. 10(b) is a cross-sectional view taken along the line IIb-IIb in FIG. 10(a)
Figure 10C:
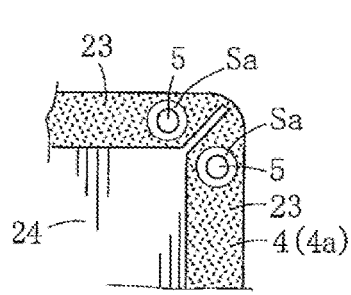
FIG. 10(c) is a rear view of the IIc part in FIG. 10(a)
Figure 10D:
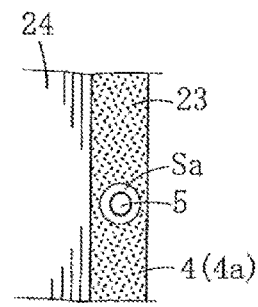
FIG. 10(d) is a rear view of the IId part in FIG. 10(a).

The hot water unit U shown in FIG. 9 is a water heater, and has a configuration in which the hot water device 1 for hot water production is accommodated in the exterior case C. The hot water device 1 includes the heat exchanger 10 through which hot water flows, the burner 11 configured to heat hot water in the heat exchanger 10, and the fan 12 configured to supply combustion air to the burner 11.

The ink jet printing layer 4 (4a and 4b) to be described below are provided on the outer surface of the exterior case C. Except for FIG. 9(a), in the drawings, a part with a dot pattern is a part in which the ink jet printing layer 4 is provided.

The exterior case C includes the rectangular box-shaped exterior case main body 2 having the opening 20 on its front surface and the cover body 3 (front cover body) for blocking the opening 20.

Figure 11:
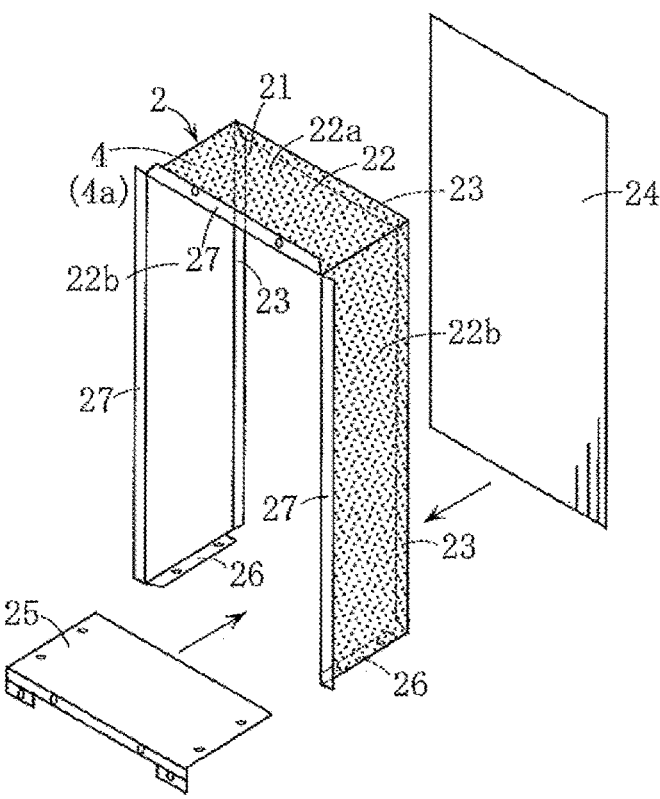
FIG. 11 is an exploded perspective view of the exterior case main body of the hot water unit shown in FIG. 9.

The exterior case main body 2 is formed of a combination of a frame 21 forming a peripheral wall 22 such as an upper wall 22a and a pair of right and left side walls 22b, a back plate 24 for blocking a rear opening of the frame 21, and a bottom plate 25 attached to the bottom of the frame 21 (refer to FIG. 11).

All of the frame 21, the back plate 24, and the bottom plate 25 are formed using a metal plate. However, among these, the frame 21 is formed using the colored steel plate 30 as a metal plate. As shown in FIG. 12(b), the colored steel plate 30 has a multi-layer structure including the plated steel plate 30a, the front side paint layer 30b laminated on a front surface of the plated steel plate 30a and the back side paint layer 30c as a base coat laminated on a back surface of the plated steel plate 30a. The front side paint layer 30b is formed in, for example, a white series color (including white). Here, in addition to the ink jet printing layer 4, these paint layers 30b and 30c correspond to examples of a "painting film" in the disclosure.

The back plate 24 is attached to the frame 21 using a plurality of inwardly bent flange parts 23 which are connected to a rear outer peripheral edge of the frame 21 (refer to FIG. 10(a) to FIG. 10(d)). That is, the back plate 24 is disposed in the frame 21 to block the rear opening of the frame 21 and the plurality of flange parts 23 are in surface-to-surface contact with the rear part of the back plate 24. The flange parts 23 and the back plate 24 are bonded via a plurality of caulking parts 5. The caulking parts 5 are, for example, tox caulkings.

The ink jet printing layer 4(4a) is provided continuously on substantially the entire area of the outer surface of the peripheral wall 22 (the upper wall 22a and the pair of right and left side walls 22b) of the frame 21 and the outer surface of the flange part 23. However, as shown in FIG. 10(a) to FIG. 10(d), the plurality of caulking parts 5, and a certain area Sa in the vicinity thereof are areas in which the ink jet printing layer 4 is not provided. On a front outer peripheral edge of the frame 21, a front side flange part 27 for allowing surface-to-surface contact with the cover body 3 is connected, and the ink jet printing layer 4a is provided continuously on substantially the entire area of the outer surface (a surface opposite to the cover body 3).

For example, the ink jet printing layer 4 is formed using an ink paint in a color different from that of the front side paint layer 30b of the colored steel plate 30, and it is possible to form various patterns, for example, traditional patterns such as a polka dot pattern, a checkered pattern, and a grid pattern, or a pattern representing a desired symbol. In addition, a part may have no pattern, or a part on which letters, symbols, numbers, or the like are displayed can be included. As will be described below, the ink jet printing layer 4 is a coating layer provided by using an ink jet printer 8. As an ink for ink jet printing, a water-based pigment ink or a solvent-based pigment ink can be used. However, in the present embodiment, an ink containing a UV curable resin, and a thermosetting resin is used.

As shown in FIG. 11, a lower flange part 26 is connected below the side wall 22b of the frame 21, and the bottom plate 25 is attached to the lower flange part 26. The bottom plate 25 is attached by, for example, screwing.

In FIG. 9, the cover body 3 is formed using the same colored steel plate as the above colored steel plate 30 as a raw material, and pressing the plate. For example, the cover body 3 is detachably attached to the front part of the exterior case main body 2 using the screw body 9 such as a screw and the screw insertion holes 31 and 28 into which the screw body 9 is inserted. On the cover body 3, the air supply port 34 through which outside air can flow into the exterior case C and the exhaust port 35 through which exhaust gas from which heat recovery by the heat exchanger 10 has been completed is discharged to the outside of the exterior case C are provided. Although the ink jet printing layer 4(4b) is provided on the outer surface of the cover body 3, the ink jet printing layer 4b is provided using an ink similar to that of the ink jet printing layer 4a and can be formed in various designs.

The exterior case main body 2 of the above exterior case C can be produced by the following processes.

Figure 12A:
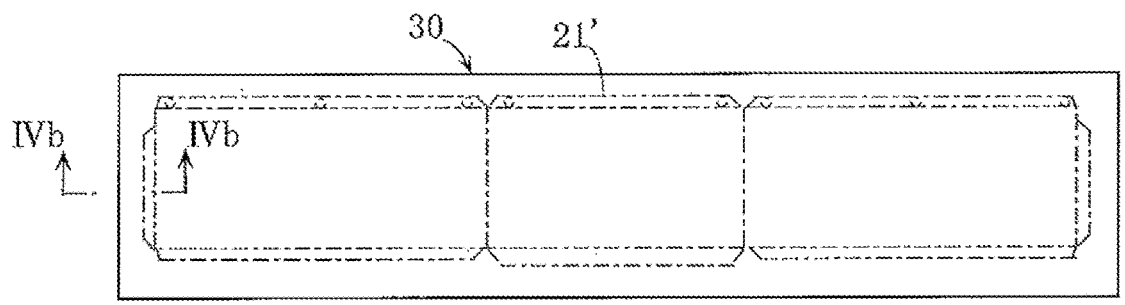
FIG. 12(a) is a front view showing a metal plate of a raw material of a frame of the exterior case main body shown in FIG. 11
Figure 12B:
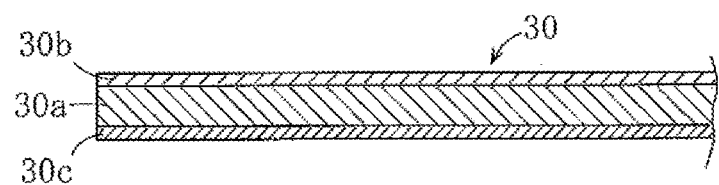
FIG. 12(b) is a cross-sectional view taken along the line IVb-IVb in FIG. 12(a).
Figure 13A:
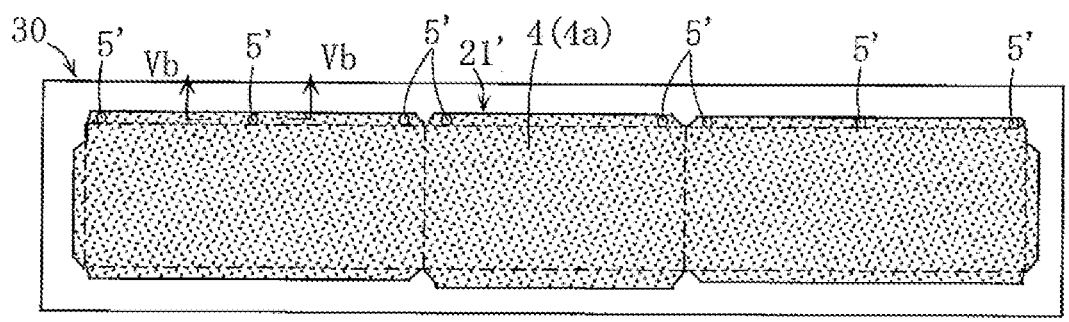
FIG. 13(a) is a front view showing a state in which an ink jet printing layer is provided on a metal plate shown in FIG. 12
Figure 13B:
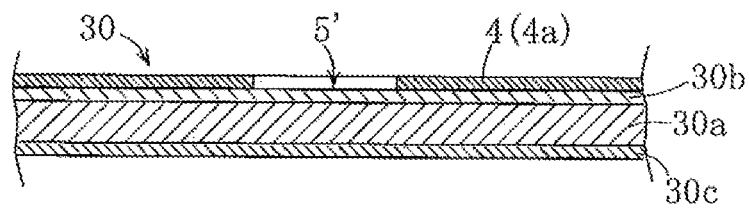
FIG. 13(b) is a cross-sectional view taken along the line Vb-Vb in FIG. 13(a).

First, as a raw material of the frame 21 of the exterior case C, the flat colored steel plate 30 shown in FIG. 12 is prepared. Next, ink jet printing is performed on the colored steel plate 30 (strictly, on the paint layer 30b of the colored steel plate 30), and as shown in FIG. 13(a), the ink jet printing layer 4(4a) is provided on a predetermined area 21' formed as the frame 21. However, as shown in FIG. 13(b), the ink jet printing layer 4 is not provided on a predetermined area 5' of the caulking part 5 and a certain area in the vicinity thereof.

The above ink jet printing is performed using, for example, the ink jet printer 8 shown in FIGS. 7(a) and 7(b). Since the operation and action of the ink jet printer 8 are the same as those in Example 1, related descriptions thereof will be omitted.

After the above ink jet printing on the colored steel plate 30 is completed, the colored steel plate 30 is heated, the ink jet printing layer 4 is dried, and a thermosetting resin contained in the ink jet printing layer 4 is cured. This heating is performed using, for example, a heating furnace. According to such processing, it is possible to increase the strength of the ink jet printing layer 4 and impart excellent weather resistance.

Figure 14:
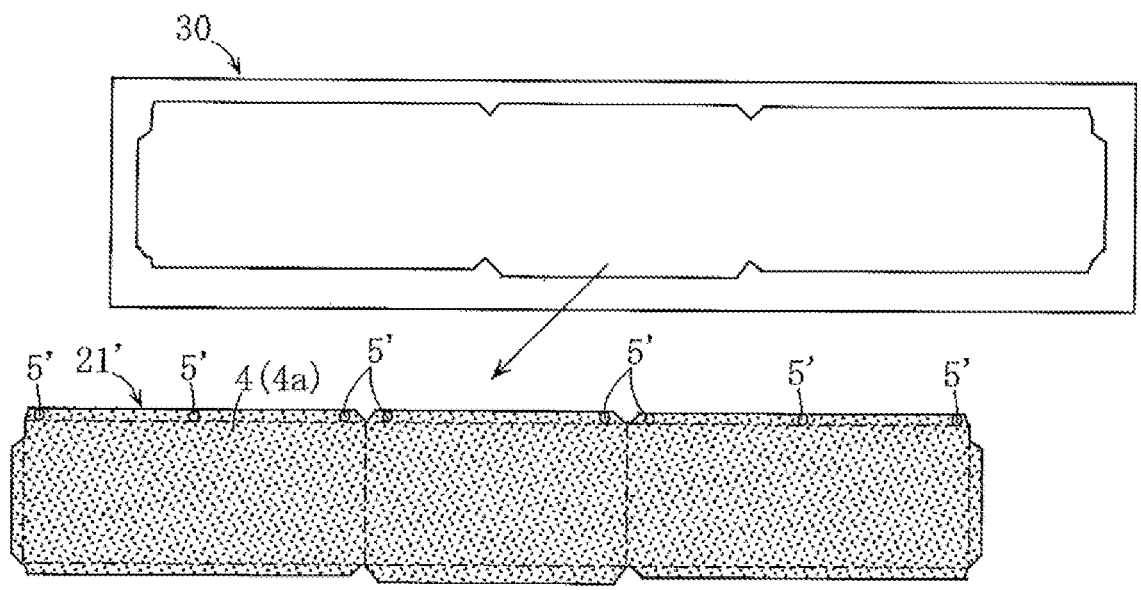
FIG. 14 is a front view showing a state in which the metal plate shown in FIG. 13 is punched and pressed.

Next, as shown in FIG. 14, the above colored steel plate 30 is punched and pressed and thus the frame intermediate product 21' is removed. In addition, the frame intermediate product 21' is additionally subjected to press processing such as bend processing, and thus the frame 21 in the form shown in FIG. 11 is produced. Then, when a caulking process for providing the caulking part 5 is provided on the flange part 23 of the frame 21 and the back plate 24, the frame 21 and the back plate 24 are bonded together.

Figures 15A, 15B:
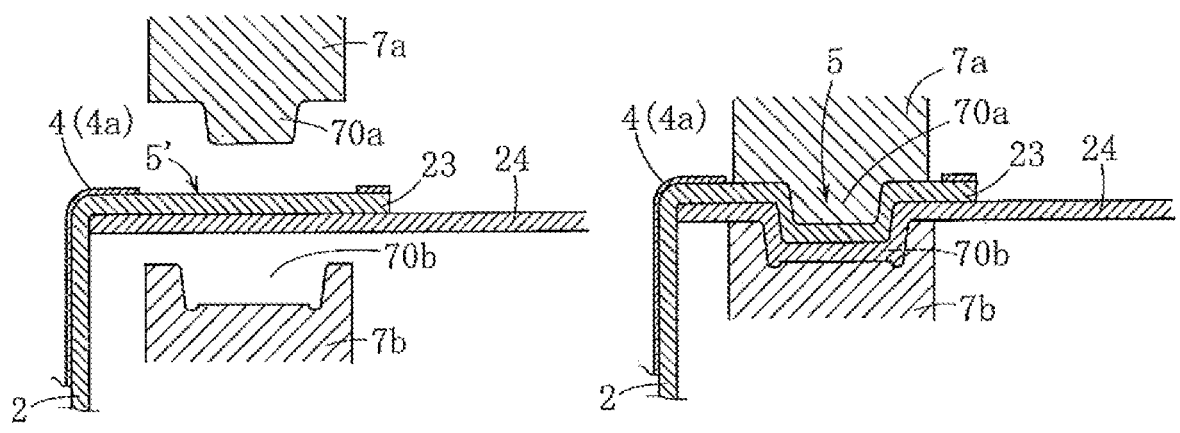
FIGS. 15(a) and 15(b) are cross-sectional views of a main part showing an example of a process of bonding a flange part of a frame and a back plate of an exterior case main body.

As shown in FIG. 15, the above caulking process is performed using the pair of caulking molds 7a and 7b having a convex part 70a and a concave part 70b for caulking. Here, an area in which the ink jet printing layer 4 is not provided is secured in the flange part 23, but this area is a caulking target area (the predetermined area 5' of the caulking part 5). Advantages of this will be described below.

Before and after the above caulking process, when the bottom plate 25 is attached to the frame 21, assembling of the exterior case main body 2 can be completed. The cover body 3 can be produced by performing ink jet printing on a colored steel plate as a raw material and then performing press processing.

Next, operations of the exterior case C and the hot water unit U described above will be described.

First, since the ink jet printing layer 4 is provided on the exterior case main body 2, it is possible to cause the hot water unit U to have excellent design properties. The ink jet printing layer 4 can be easily provided using the above ink jet printer 8. For example, unlike painting using a spray system, masking processing and paint color matching are not performed and expert skills are not required. Therefore, it is possible to improve workability and productivity. In addition, it is easy to change a design represented on the ink jet printing layer 4 and production of small quantities of many different kinds is appropriate. Furthermore, according to ink jet printing, there is no or little waste of the ink paint, and the environmental load is also small. Since a base of the ink jet printing layer 4 is the paint layer 30b of the colored steel plate 30, even if a part in which the ink jet printing layer 4 is not provided is provided, it is possible to cause the part to have a favorable appearance and weather resistance.

Since the ink jet printing layer 4 of the exterior case main body 2 is provided continuously not only on the peripheral wall 22 of the frame 21 but also on the flange part 23 that is positioned on the back side of the exterior case main body 2, it is possible to improve an appearance of the back side of the exterior case main body 2.

On the other hand, as described above, while the flange part 23 and the back plate 24 are bonded together according to the caulking process shown in FIG. 15, the ink jet printing layer 4 is not provided in the caulking target area. Therefore, as the caulking molds 7a and 7b, it is possible to use a mold produced for the general colored steel plate 30 on which the ink jet printing layer 4 is not provided without change. Unlike the present embodiment, within the flange part 23, when the ink jet printing layer 4 is also provided in the caulking target area, since the thickness of the entire caulking target area increases, fitting between the convex part 70a and the concave part 70b of the caulking molds 7a and 7b becomes shallow, and there is a risk of caulking between the flange part 23 and the back plate 24 becoming insufficient. In addition, there are risks of cracks and the like occurring in the ink jet printing layer 4 and adverse effects caused on other parts of the ink jet printing layer 4. On the other hand, according to the present embodiment, it is possible to appropriately eliminate such a risk.

The disclosure is not limited to the content of the above embodiment. Designs of specific configurations of the exterior case for a hot water unit according to the embodiments of the disclosure and respective components of the hot water unit can be variously changed within a range intended by the disclosure. In addition, specific configurations of processes of a method of producing an exterior case for a hot water unit according to the embodiments of the disclosure can be variously changed.

In the above embodiment, tox caulking is used as a bonding method of bonding the flange part 23 of the frame 21 and the back plate 24. The disclosure is not limited thereto. A caulking method different from tox caulking may be used. Bonding using rivets may be attempted. Furthermore, a welding method such as spot welding may be used.

In the above embodiment, an example in which the flange part 23 of the frame 21 and the back plate 24 are bonded together has been exemplified as an example of a bonding process in which a plurality of metal plate parts are bonded together. However, the disclosure is not limited thereto, and specific types and parts of metal plate parts to be bonded are not limited. In short, a plurality of metal plate parts constituting the exterior case are sufficient. In the metal plate part, a metal plate is used as a raw material. However, the metal plate is not limited to a colored steel plate. For example, other metal plates such as a simple stainless steel plate and an aluminum plate can be used as a raw material.

The disclosure is not limited to content of the above embodiment. Specific configurations of operational processes of a method of producing an exterior case for a hot water unit according to the embodiments of the disclosure can be variously changed within a range intended by the disclosure.

While an example in which ink jet printing is performed only on the cover body 3 has been shown in the above embodiment, in the disclosure, in place of or in addition thereto, of course, ink jet printing may also be performed on the exterior case main body 2. Specific details such as letters and patterns represented on the ink jet printing layer of the disclosure are not limited, and at least one of letters, symbols, figures, and patterns may be represented.

The hot water unit in the embodiments of the disclosure is a concept of a hot water storage tank unit in which a hot water device for hot water storage such as a hot water storage tank is accommodated in an exterior case in addition to a concept in which a hot water device for hot water production such as a water heater is accommodated in an exterior case. Therefore, the exterior case is not limited to a combination of an exterior case main body having a front opening and a cover body for blocking the front opening.

As a material of the exterior case, a flat metal plate is used. However, as the metal plate, a material other than a colored steel plate can be used.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of producing an exterior case for a hot water unit comprising:
    a pressing process in which press processing is perfoiiiied on a flat metal plate, and a component part of an exterior case used for accommodating a hot water device for hot water production or hot water storage therein is formed; and
    a painting process in which any of letters, symbols, figures, and patterns is painted on the component part of the exterior case,
    wherein the painting process includes an ink jet printing process in which ink jet printing is performed on the flat metal plate and an ink jet printing layer is formed, and
    wherein the pressing process is performed after the ink jet printing process,
    wherein the exterior case includes an exterior case main body having at least one surface as an opening and a cover body that is attached to the exterior case main body to block the opening, and
    wherein the painting process and the pressing process are performed as a method of producing the cover body,
    the pressing process includes a drawing process in which the flat metal plate is bent, and the exterior case after the drawing process forms an outer peripheral flange part and a bulging part that is surrounded by the outer peripheral flange part, and
    the ink jet printing layer is formed on the bulging part of the exterior case.

2. The method of producing an exterior case for a hot water unit according to claim 1,
    wherein the pressing process includes a process in which drawing processing is performed on the metal plate, and
    in the ink jet printing process, within a predetermined area in which the drawing process is scheduled, a thickness of an ink jet printing layer of a part in which a plate thickness of the metal plate is thinner than other parts is thinner than a thickness of an ink jet printing layer of other parts.

3. The method of producing an exterior case for a hot water unit according to claim 1,
    wherein the pressing process includes a process in which a burring hole having a burring part projecting from a peripheral edge of the opening is provided at the metal plate, and
    in the ink jet printing process, on a predetermined area scheduled to become the burring part, an ink jet printing layer connected to an ink jet printing layer provided in the part surrounding thereof is provided.

4. The method of producing an exterior case for a hot water unit according to claim 1,
    wherein, in the ink jet printing process, a marker for positioning the metal plate when the pressing process is performed is printed.

5. The method of producing an exterior case for a hot water unit according to claim 1,
    wherein, in the ink jet printing, an ink containing a UV curable resin is used, and in a procedure of moving a print head for ink jet printing and proceeding an operation of applying the ink to the metal plate, a process in which ultraviolet rays are emitted to the ink applied to the metal plate is performed at the same time.

6. The method of producing an exterior case for a hot water unit according to claim 1,
    wherein, in the ink jet printing, an ink containing a thermosetting resin is used, and after the ink jet printing is completed, the thermosetting resin is cured by heating the ink jet printing layer, and after the curing, the pressing process is performed.

7. A method of producing an exterior case for a hot water unit used for accommodating a hot water device for hot water production or hot water storage therein, comprising:
    a bonding process in which a plurality of metal plate parts are bonded together; and
    a painting process in which painting is applied to at least a part of the plurality of metal plate parts,
    wherein the painting process includes an ink jet printing process, and
    wherein the ink jet printing process is performed before the bonding process, and ink jet printing is not performed on a predetennined area to be subjected to the bonding process among the plurality of metal plate parts.

8. The method of producing an exterior case for a hot water unit according to claim 7, further comprising:
    a pressing process in which at least one of the plurality of metal plate parts is formed by pressing a flat metal plate before the bonding process,
    wherein the ink jet printing process is performed before press processing is performed on the flat metal plate.

9. The method of producing an exterior case for a hot water unit according to claim 8,
    wherein the plurality of metal plate parts are a frame having a peripheral wall constituting a part of the exterior case main body having a front opening and a back plate for blocking a rear opening of the frame,
    wherein the pressing process includes a process in which the flat metal plate is bent and the frame is formed, and a flange part overlapping an outer surface of the back plate is connected to a rear peripheral edge of the frame, wherein the bonding process includes bonding processing in which a plurality of parts of the flange part and the back plate are bonded together, and wherein, in the ink jet printing process, within the flat metal plate, substantially the entire area of a part corresponding to an outer surface of the peripheral wall of the exterior case main body, and within an area corresponding to an outer surface of the flange part, substantially the entire area except for an area to be subjected to the bonding processing, are subjected to ink jet printing.

10. An exterior case for a hot water unit used for accommodating a hot water device for hot water production or hot water storage therein, comprising:

a plurality of metal plate parts, wherein one of the metal plate parts has a bonding processing part, and the one of the metal plate part is bonded to another of the metal plate part at the bonding processing part; and a painting film that is provided on at least a part of an outer surface area of the plurality of metal plate parts, wherein the painting film includes an ink jet printing layer, and wherein the ink jet printing layer is provided on parts except the bonding processing part of the one of the metal plate part, the exterior case for a hot water unit comprising:

an exterior case main body having a front opening, wherein the exterior case main body includes a frame having a peripheral wall constituting a part of the exterior case main body and a back plate for blocking a rear opening of the frame, wherein a flange part overlapping an outer surface side of the back plate is connected to a rear peripheral edge of the frame and the bonding processing part is provided at a plurality of parts of the flange part and the back plate, and wherein the ink jet printing layer is provided on substantially the entire area of the outer surface of the peripheral wall of the frame and within the flange part, substantially the entire area excluding the bonding processing part.

11. The exterior case for a hot water unit according to claim 10, wherein the bonding processing part is a caulking part.

* * * * *